(12) United States Patent
Arechiga Gonzalez et al.

(10) Patent No.: US 11,256,611 B2
(45) Date of Patent: Feb. 22, 2022

(54) SIMULATION-BASED TECHNIQUE TO SYNTHESIZE CONTROLLERS THAT SATISFY SIGNAL TEMPORAL LOGIC SPECIFICATIONS

(71) Applicant: TOYOTA RESEARCH INSTITUTE, INC.

(72) Inventors: Nikos Arechiga Gonzalez, San Mateo, CA (US); Karen Y. Leung, Mountain View, CA (US); Soon Ho Kong, Arlington, MA (US); Jonathan Decastro, Arlington, MA (US); Frank Permenter, Cambridge, MA (US)

(73) Assignees: TOYOTA RESEARCH INSTITUTE, INC., Los Altos, CA (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 253 days.

(21) Appl. No.: 16/425,723

(22) Filed: May 29, 2019

(65) Prior Publication Data
US 2020/0379893 A1      Dec. 3, 2020

(51) Int. Cl.
| | |
|---|---|
| *G06F 11/36* | (2006.01) |
| *G06N 3/08* | (2006.01) |
| *G06F 17/13* | (2006.01) |
| *G06N 5/02* | (2006.01) |
| *G06F 30/20* | (2020.01) |

(52) U.S. Cl.
CPC .......... *G06F 11/3692* (2013.01); *G06F 17/13* (2013.01); *G06F 30/20* (2020.01); *G06N 3/084* (2013.01); *G06N 5/02* (2013.01)

(58) Field of Classification Search
CPC ...... G06F 11/3692; G06F 30/20; G06F 17/13; G06N 3/084; G06N 5/02
USPC .......................................................... 703/13
See application file for complete search history.

(56) References Cited

U.S. PATENT DOCUMENTS

| | | | |
|---|---|---|---|
| 9,081,900 B2 | 7/2015 | Deshmukh et al. | |
| 10,455,356 B2 * | 10/2019 | Dupray | ................. H04M 3/493 |

OTHER PUBLICATIONS

Wierstra_2009 (Recurrent Policy Gradients, Elsevir Journal of Algorithms in Cognition, Informatics and Logic May 6, 2009). (Year: 2009).*

(Continued)

*Primary Examiner* — Brian S Cook
(74) *Attorney, Agent, or Firm* — Seyfarth Shaw LLP

(57) ABSTRACT

A method for synthesizing parameters for control of a closed loop system based on a differentiable simulation model of the closed loop system includes determining requirements/specifications for the closed loop system in signal temporal logic (STL). The method also includes selecting a parametric control law having a differentiable parameter control function. The method also includes converting the requirements in signal temporal logic into differentiable computational graph. The method further includes building the differentiable simulation model as a differentiable computational graph. Furthermore, the method includes automatically learning values of parameters for the differentiable parameter control function of the closed loop system by backpropagating an error.

21 Claims, 8 Drawing Sheets

(56) References Cited

OTHER PUBLICATIONS

Kan_2017 (Self-supervised Deep Reinforcement Learning with Generalized Computation Graph for Robot Navigation, May 17, 2018) (Year: 2018).*
Li_2017 (Reinforcement Learning with Temporal Logic Rewards, Mar. 2, 2017) (Year: 2017).*
Seshi_2014 (EECS 294-98 Introduction to Temporal Logic, EECS, US Berkeley 2014) (Year: 2014).*
Donze_2014 (On Signal Temporal Logic, University of California, Berkeley Feb. 3, 2014) (Year: 2014).*
Raman, et al., "Reactive Synthesis from Signal Temporal Logic Specifications," iliad.stanford.edu, Feb. 27, 2019.
Xiang, et al., "Verification for Machine, Learning, Autonomy, and Neural Networks Survey," arxiv.org, Oct. 5, 2018.
Abbas, et al., "Relaxed Decidability and the Robust Semantic of Metric Temporal Logic," repository.upenn.edu, Feb. 2, 2017.
Dorsa Sadigh, "Safe and Interactive Autonomy: Control, Learning, and Verification," eecs.berkeley.edu, Aug. 11, 2017.

* cited by examiner

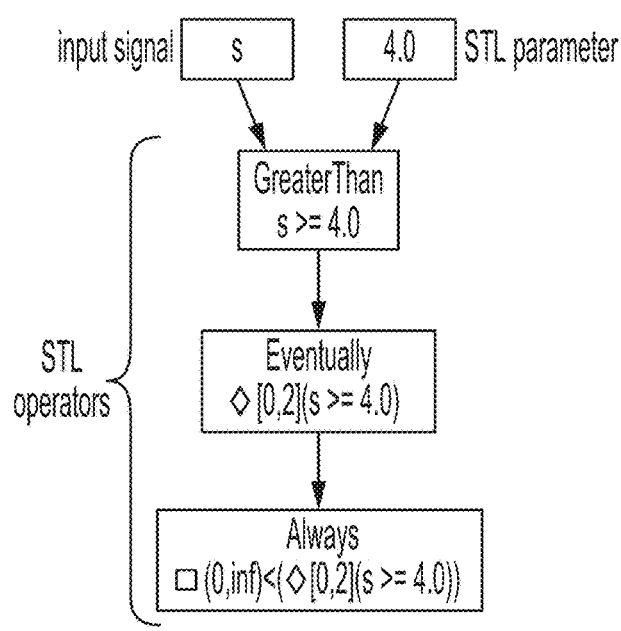 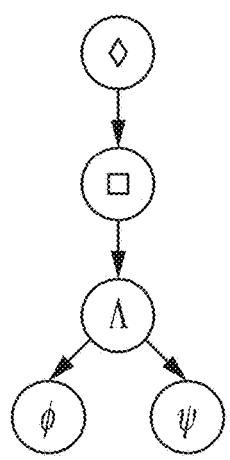 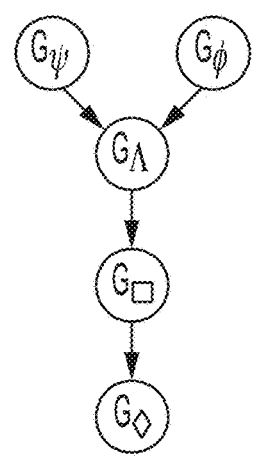
*FIG. 5A*          *FIG. 5B*          *FIG. 5C*

SIMULATION-BASED TECHNIQUE TO SYNTHESIZE CONTROLLERS THAT SATISFY SIGNAL TEMPORAL LOGIC SPECIFICATIONS

BACKGROUND

Field

Certain aspects of the present disclosure generally relate to simulation based techniques to synthesize controllers and, more particularly, to simulation based techniques to synthesize controllers that satisfy signal temporal logic specifications.

Background

Learning logical formulas from data can be a powerful analysis tool, as it offers insight into the structure and logical properties of a system in an unsupervised manner. However, learning the logical structure directly from data is challenging as the space of logical formulas is large. There has been work on mining formulas from data, but tractable methods often limit the class of learnable formulas and can be computationally demanding.

A proxy for a logical structure is to use decision trees, in the sense that logical predicates are tested for truth or falsehood at each node of the tree. Some implementations provide a differentiable formulation for decision trees that can be trained by backpropagation. However, decision trees do not have an internal state, which means that they do not provide the same dynamic richness as many temporal logic formulas which can express and monitor properties that evolve over time.

A variety of techniques exist to generate parameters for control software. For example, proportional integral derivative (PID) gains can be tuned to achieve a set-point using heuristics such as the Ziegler-Nichols method. State-variable feedback controllers can be tuned via pole-placement techniques to attain properties such as stability, and tune speed of system reaction. Also, optimization of cost functions can be accomplished through model predictive control or via a linear quadratic regulator. However, these traditional control synthesis techniques generally only try to satisfy specifications such as stability and speed of response.

SUMMARY

In one aspect of the present disclosure, a method for control of a closed loop system based on a differentiable simulation model of the closed loop system is disclosed. The method includes determining requirements/specifications for the closed loop system in signal temporal logic (STL). The method also includes selecting a parametric control law having a differentiable parameter control function. The method also includes converting the requirements in signal temporal logic into differentiable computational graph. The method further includes building the differentiable simulation model as a differentiable computational graph. Furthermore, the method includes automatically learning values of parameters for the differentiable parameter control function of the closed loop system by backpropagating an error.

Another aspect of the present disclosure is directed to an apparatus for synthesizing parameters for control of a closed loop system based on a differentiable simulation model of the closed loop system. The apparatus having a memory and one or more processors coupled to the memory. The processor(s) is configured to determine requirements/specifications for the closed loop system in signal temporal logic (STL). The processor(s) is also configured to select a parametric control law having a differentiable parameter control function. The processor(s) is also configured to convert the requirements in signal temporal logic into differentiable computational graph. The processor(s) is further configured to build the differentiable simulation model as a differentiable computational graph. Furthermore, the processor(s) is configured to automatically learn values of parameters for the differentiable parameter control function of the closed loop system by backpropagating an error.

In another aspect of the present disclosure, a non-transitory computer-readable medium with non-transitory program code recorded thereon is disclosed. The program code is for synthesizing parameters for control of a closed loop system based on a differentiable simulation model of the closed loop system. The program code is executed by a processor and includes program code to determine requirements/specifications for the closed loop system in signal temporal logic (STL). The program code also includes program code to select a parametric control law having a differentiable parameter control function. The program code also includes program code to convert the requirements in signal temporal logic into differentiable computational graph. The program code further includes program code to build the differentiable simulation model as a differentiable computational graph. Furthermore, the program code includes program code to automatically learn values of parameters for the differentiable parameter control function of the closed loop system by backpropagating an error.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 5A-5C are exemplary graphical representations of signal temporal logic formula, according to aspects of the present disclosure.

DETAILED DESCRIPTION

Figure 1:
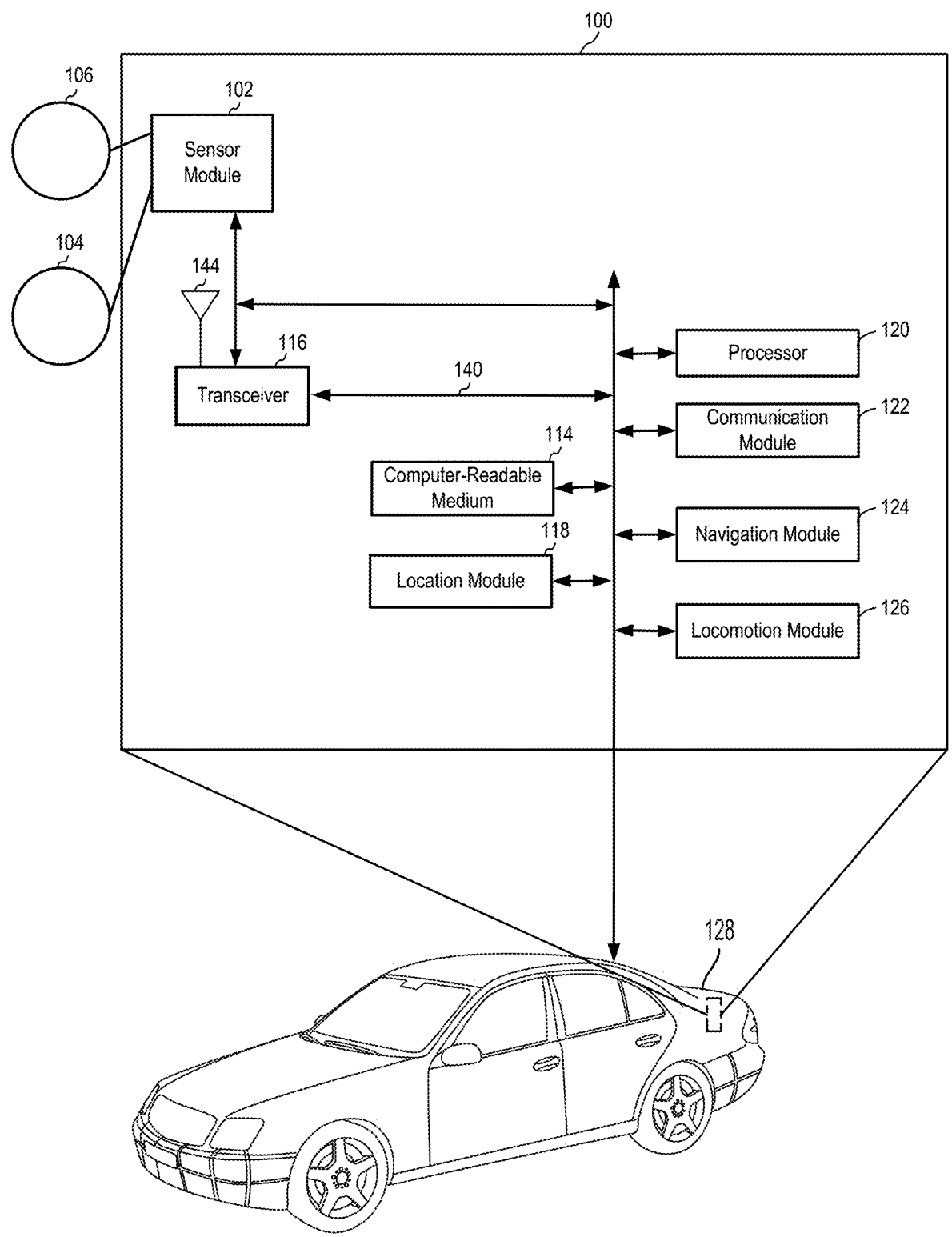
FIG. 1 is a diagram illustrating an example of a hardware implementation for a vehicle operating mode system according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Signal Temporal Logic (STL) is an expressive formal language that can specify properties of both continuous and hybrid systems, and give a measure of how much those properties are satisfied. It can deal with real-valued dense-time signals, making it a versatile and useful tool in many robotics applications such as autonomous driving robot arm implementations, etc. In addition to Boolean semantics, STL is equipped with quantitative semantics. It can provide a robustness value, which is a continuous real-valued scalar that represents a degree of satisfaction over the specification. Accordingly, STL is used to model driving behaviors as it can describe high-level specifications and can quantify satisfaction of the specification.

STL can also be used to specify behaviors over a longer time horizon. For example, STL is used as constraints in model predictive control and stochastic control problems, and also as rewards in reinforcement learning. For example, instead of attempting to learn complete STL formulas from scratch, a common approach is to learn parameters of a parametric STL formula (pSTL).

A pSTL formula is a template STL formula, and given time series data, it is possible to optimize over the parameters to find the values that provide the tightest fit in terms of robustness. Using pSTL formulas in this way is especially powerful when the formula comes from domain knowledge. This parameter identification can be thought of as a form of feature extraction from time series data. However, a key drawback of existing techniques is that they only support monotonic formulas. For example, formulas whose satisfaction depends monotonically on the parameters.

Some control synthesis techniques use model-predictive control to satisfy signal temporal logic specifications. However, model-predictive control requires running an optimization problem online, which is computationally expensive for embedded computing platforms. Thus, it is desirable to address a rich class of temporal properties about the behavior of a closed loop system with reduced computational expense.

Aspects of the present disclosure leverage an efficiency of computation graphs and use smooth differentiable approximations to tractably and efficiently learn parameters of complex, possibly non-monotonic, pSTL formulas. By using computation graphs, state-of-the-art machine learning tools are leveraged to create an efficient framework for evaluating the robustness of STL formulas. By representing STL robustness formulas as computation graphs, the proposed implementation takes advantage of the benefits afforded by using state-of-the-art machine learning tools, such as auto-differentiation, batching, and ease of parallelization.

Aspects of the present disclosure are directed to a simulation-driven framework to automatically synthesize parameters of control software, including but not limited to cars, airplanes, or robots, such that the overall system satisfies specifications given in signal temporal logic (STL). For example, signal temporal logic expresses properties, such as, "the system should always avoid bumping into obstacles," or "the system should not perform action A until event B occurs," and many others into syntax and semantics.

A method or system for synthesizing parameters for control of a closed loop system based on a differentiable simulation model of the closed loop system is described. In one aspect, specifications/requirements, in signal temporal logic, for a closed loop system are determined. The specifications/requirements are used to synthesize a controller of a closed loop control system. These specifications are obtained and expressed in signal temporal logic. For example, a hardware component (e.g., controller) in a closed loop control system is specified to be controlled (e.g., by software). The set of requirements are then obtained for the closed loop control system and expressed in the signal temporal logic.

A parametric control law associated with a differentiable parameter control function is selected. The parametric control law may be based on one of a variety of parametric templates including, but not limited to, proportional integral derivative (PID) controllers, state variable feedback and neural networks. Some control laws include an internal state that is useful for the implementation of the aspects of the present disclosure. Some controllers (e.g., a PID controller) include internal state. For example, an integrator of the PID controller is considered to be an internal state because, to integrate or add up over time, it remembers values from the past. Also, Kalman Filters maintain an internal state that is an average of things it has observed, in an attempt to remove noise. Kalman Filters are commonly used as part of a controller, so the internal state of the Kalman Filter in turn is an internal state of the overall controller. Similarly, control strategies based on neural networks, such as gated recurrent units (GRUs) or long short term memories (LSTMs), explicitly include memory cells, which are considered to be internal states. The differentiable parameter control function may be directed to a PID controller, a state variable feedback controller, set points, look up tables, or a neural network, to name a few.

The signal temporal logic specifications are converted to a differentiable computational graph, using techniques such as backpropagation for parametric signal temporal logic described herein. The simulation model of the closed loop control system is built as a differentiable computational graph. Accordingly, the simulation model of a physical controller of the closed loop system is differentiable. The simulation model may be built as a computational graph that includes a controller, plant and signal temporal logic computation graphs. In one aspect, the differential simulation model is a continuous-time model, a differentiable discrete model or any other model that is differentiable.

In one aspect, the simulation model is built by selecting (e.g., randomly selecting) an initial state for the closed loop system, and initializing the differentiable parameter control function to the initial state. The initial state may be a fixed initial state. The simulation model is further built by determining a robustness value for the signal temporal logic specifications at each time step when a simulation trace is run and by differentiating through the computational graph of the signal temporal logic.

Values of parameters for the differentiable parameter control function of the closed loop system are automatically learned by a backpropagation implementation. For example, the values are learned by backpropagating an error. In one aspect, the parameters of the parametric control law are modified using backpropagation through time to improve the robustness of the signal temporal logic specifications. Further aspects of the present disclosure include running random simulations of the overall computational graph using backpropagation through time to satisfy the specifications of the signal temporal logic.

The aspects of the present disclosure are not limited to the current architecture. That is, aspects of the present disclosure may be applied to a variety of control architectures, ranging from the simplest proportional integral derivative (PID) control architectures to the most modern neural network-based controllers. The aspects of the present disclosure can be used to find parameter values of control laws with arbitrary architecture, from traditional PID and state variable feedback designs to the most sophisticated neural network controllers. Furthermore, the techniques described herein are not limited to stability specifications, but can handle any specification that can be expressed in STL.

FIG. 1 is a diagram illustrating an example of a hardware implementation for a vehicle operating mode system 100, according to aspects of the present disclosure. The vehicle operating mode system 100 may be a component of a vehicle, a robotic device, or another device. For example, as shown in FIG. 1, the vehicle operating mode system 100 is a component of a vehicle 128. The vehicle 128 may be an MAAS vehicle or a personal use vehicle. Aspects of the present disclosure are not limited to the vehicle operating mode system 100 being a component of the vehicle 128, as other devices, such as a bus, boat, drone, or robot, are also contemplated for using the vehicle operating mode system 100.

The vehicle 128 may operate in at least an autonomous operating mode and a manual operating mode. Other operating modes, such as semi-autonomous are also contemplated. Furthermore, the vehicle 128 may be an electric vehicle, a hybrid vehicle, a fuel vehicle, or another type of vehicle.

The vehicle operating mode system 100 may be implemented with a bus architecture, represented generally by a bus 140. The bus 140 may include any number of interconnecting buses and bridges depending on the specific application of the vehicle operating mode system 100 and the overall design constraints. The bus 140 links together various circuits including one or more processors and/or hardware modules, represented by a processor 120, a communication module 122, a location module 118, a sensor module 102, a locomotion module 126, a navigation module 124, and a computer-readable medium 114. The bus 140 may also link various other circuits such as timing sources, peripherals, voltage regulators, and power management circuits, which are well known in the art, and therefore, will not be described any further.

The vehicle operating mode system 100 includes a transceiver 116 coupled to the processor 120, the sensor module 102, the communication module 122, the location module 118, the locomotion module 126, the navigation module 124, and the computer-readable medium 114. The transceiver 116 is coupled to an antenna 144. The transceiver 116 communicates with various other devices over a transmission medium. For example, the transceiver 116 may receive commands via transmissions from a user or a remote device. As another example, the transceiver 116 may transmit driving statistics to a server (not shown). For example, the driving statistics may be included in a dataset of cars driving on the road that is used to generate test cases for the vehicle 128 to ensure that the vehicle 128 is certifiably safe and robust.

The vehicle operating mode system 100 includes the processor 120 coupled to the computer-readable medium 114. The processor 120 performs processing, including the execution of software stored on the computer-readable medium 114 providing functionality according to the disclosure. The software, when executed by the processor 120, causes the vehicle operating mode system 100 to perform the various functions described for a particular device, such as the vehicle 128, or any of the modules 102, 114, 116, 118, 120, 122, 124, 126. The computer-readable medium 114 may also be used for storing data that is manipulated by the processor 120 when executing the software.

The sensor module 102 may be used to obtain measurements via different sensors, such as a first sensor 106 and a second sensor 104. The first sensor 106 may be a vision sensor, such as a stereoscopic camera or a red-green-blue (RGB) camera, for capturing 2D images. The second sensor 104 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 104, 106.

The measurements of the first sensor 106 and the second sensor 104 may be processed by one or more of the processor 120, the sensor module 102, the communication module 122, the location module 118, the locomotion module 126, the navigation module 124, in conjunction with the computer-readable medium 114 to implement the functionality described herein. In one configuration, the data captured by the first sensor 106 and the second sensor 104 may be transmitted to an external device via the transceiver 116. The first sensor 106 and the second sensor 104 may be coupled to the vehicle 128 or may be in communication with the vehicle 128.

The location module 118 may be used to determine a location of the vehicle 128. For example, the location module 118 may use a global positioning system (GPS) to determine the location of the vehicle 128. The communication module 122 may be used to facilitate communications via the transceiver 116. For example, the communication module 122 may be configured to provide communication capabilities via different wireless protocols, such as WiFi, long term evolution (LTE), 4G, etc. The communication module 122 may also be used to communicate with other components of the vehicle 128 that are not modules of the vehicle operating mode system 100.

The locomotion module 126 may be used to facilitate locomotion of the vehicle 128. As an example, the locomotion module 126 may control a movement of the wheels. As another example, the locomotion module 126 may be in communication with one or more power sources of the vehicle 128, such as a motor and/or batteries. Of course, aspects of the present disclosure are not limited to providing locomotion via wheels and are contemplated for other types of components for providing locomotion, such as propellers, treads, fins, and/or jet engines.

The vehicle operating mode system 100 also includes the navigation module 124 for planning a route or controlling the locomotion of the vehicle 128, via the locomotion module 126. In one configuration, the navigation module 124 overrides the user input when the user input is expected (e.g., predicted) to cause a collision. The modules may be software modules running in the processor 120, resident/stored in the computer-readable medium 114, one or more hardware modules coupled to the processor 120, or some combination thereof.

The sensor module 102 may receive the sensor data from the first sensor 106 and the second sensor 104. According to aspects of the present disclosure, the sensor module 102 may filter the data to remove noise, encode the data, decode the data, merge the data, extract frames, or perform other functions.

The operating mode system 100, the processor 120, and/or any of the modules may be designed based on a controller that is synthesized according to aspects of the present disclosure.

Figure 2:
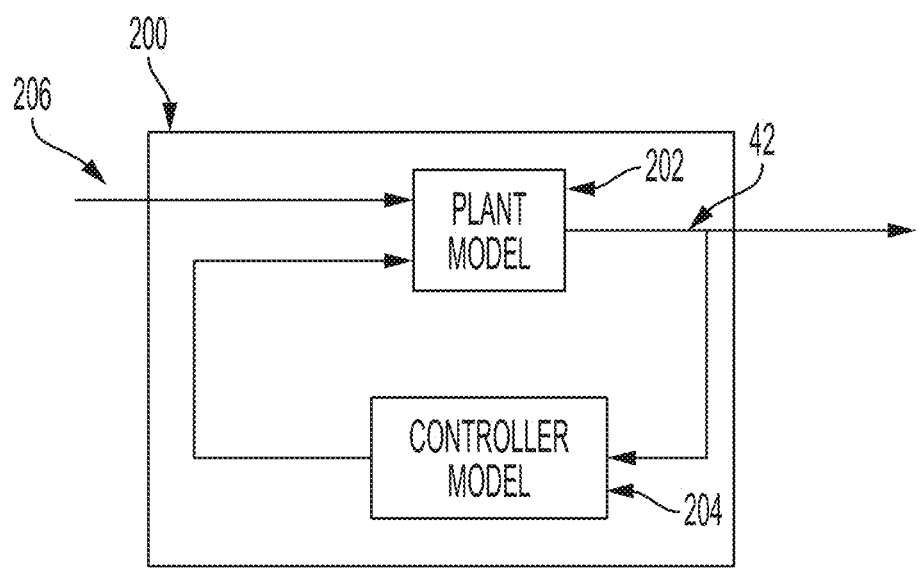
FIG. 2 schematically illustrates an example closed loop system model.

FIG. 2 schematically illustrates an example closed loop system model 200. Embedded software for controlling the operation of complex real-world systems is often designed using the model-based development (MBD) paradigm. In this paradigm, designers develop a model of the physical aspects of the system, known as the plant model 202, and also develop a model of the embedded real-time software, known as the controller model 204, as shown in FIG. 2. These models are generally developed using a block-diagram based visual programming language such as Simulink® (a product of Mathworks in Natick, Mass.).

When the plant model 202 and the controller model 204 are developed, designers then combine these models to obtain the closed loop system model 200. The inputs 206 to the closed loop system model 200 are exogenous inputs to the plant model 202 (such as ambient temperature, atmospheric pressure, driver input, pilot commands, etc.), and outputs of the plant model 202 generally include controlled signals of the plant model 202. In general, the closed loop model 200 also has a number of parameters including initial conditions of various state-carrying elements in the model. This includes initial values for memory elements in the controller model 204 and the initial configuration for the physical elements in the plant model 202.

Figure 3:
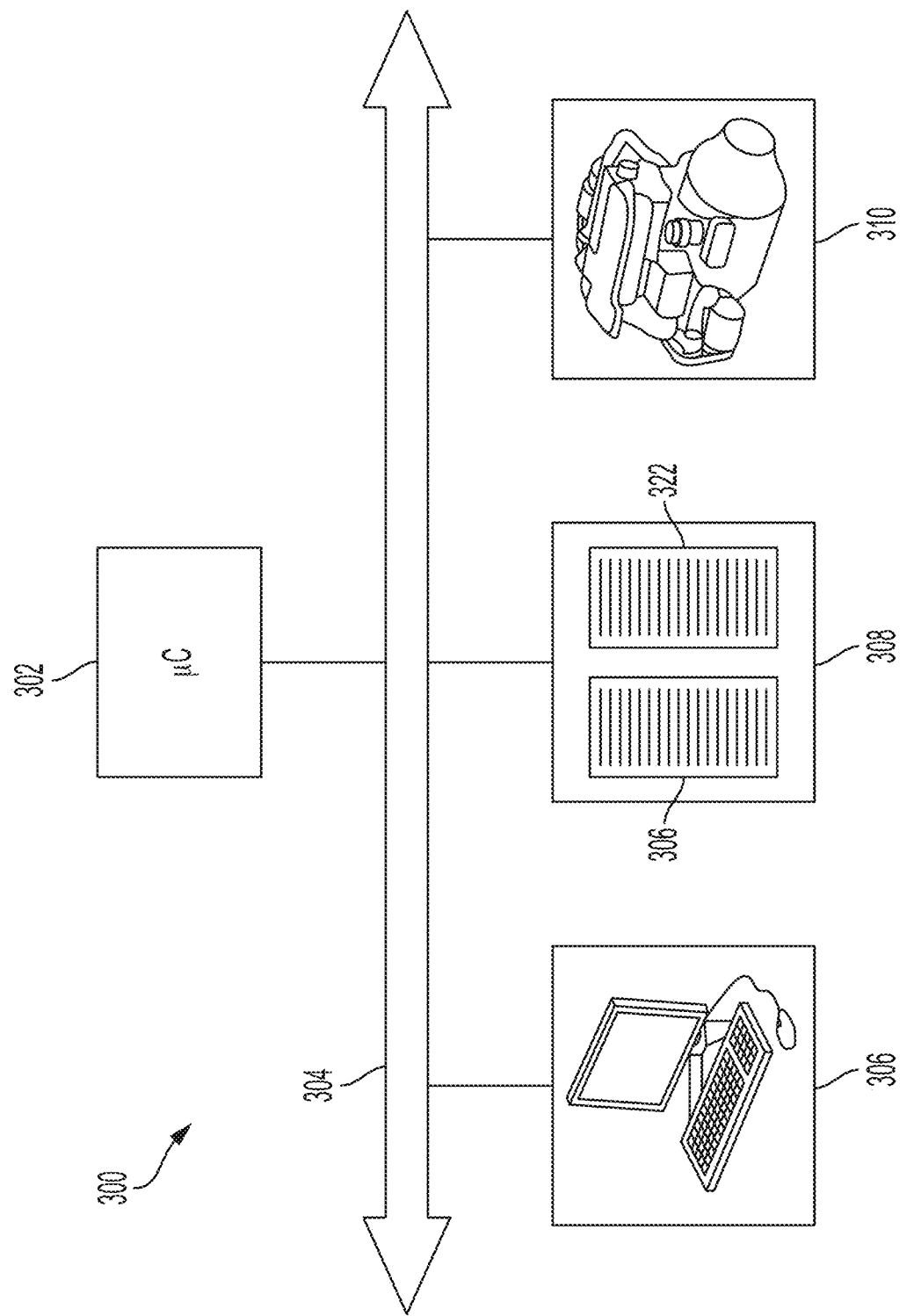
FIG. 3 schematically illustrates a computing device for synthesizing parameters for control of a closed loop system based on a differentiable simulation model of the closed loop system.

FIG. 3 schematically illustrates hardware components of a computing device 300 (or system) used to implement the methods described herein. It should be understood that the aspects of the present disclosure are not limited to the components and the configuration depicted in FIG. 3, and that other components and configurations may be used. The computing device 300 may be configured as a general purpose computer or an application-specific computing device. The computing device 300 may be any computer capable of running MBD programs or other programming tools.

Generally, the illustrated computing device 300 may be embodied as a separate computing device, a plurality of networked computing devices and/or a computer-program product comprising non-transitory computer-readable medium for evaluating software and control systems for evaluating a closed loop model or system for undesirable behaviors. It is noted that the systems and methods for synthesizing parameters may be executed by a computing device that is external to the illustrated computing device 300 in some aspects. For example, a first computing device may be used for MBD purposes, while a second computing device may be used for synthesizing parameters.

The example computing device 300 illustrated in FIG. 3 includes at least one processor 302, input/output hardware 306, a non-transitory computer-readable medium 308, and a plant model representation 310 that is configured to simulate the actual system for which the software code is designed, such as a motor, a vehicle, an electronic braking system, and the like. The non-transitory computer-readable medium 308 may store differentiable parametric controller template and parameter synthesizing logic 320, for example, and the software code 322 of the controller model, for example. It is noted that, in some aspects, the computing device 300 may receive data from an actual physical plant (e.g., engine, vehicle) rather than, or in conjunction with, the computer simulated plant representation 310. Other components may also be provided, such as network hardware (e.g., modem, LAN port, wireless fidelity (Wi-Fi) card, WiMax card, mobile communications hardware, and/or other hardware for communicating with other networks and/or devices.).

The non-transitory computer-readable medium 308 may be configured as volatile and/or nonvolatile computer readable medium and, as such, may include random access memory (including SRAM, DRAM, and/or other types of random access memory), flash memory, registers, compact discs (CD), digital versatile discs (DVD), magnetic disks, and/or other types of storage components. In some aspects, the plant representation 310 may also be stored on the computer-readable medium 308, or externally from the computing device 300. A local interface 304 is also included in FIG. 3 and may be implemented as a bus or other interface to facilitate communication among the components of the computing device 300. As stated above, in some aspects, the plant representation 310 may not be provided by computer simulation but rather an actual physical plant under evaluation (e.g., an engine, a vehicle, and the like).

The at least one processor 302 may include any processing device(s) configured to receive and execute instructions (such as from the computer-readable medium 308). The input/output hardware 306 may include any hardware and/or software for providing input and receiving output to and from the computing device 300, such as, without limitation a keyboard, mouse, display, camera, microphone, speaker, touch-screen, and/or other device for receiving, sending, and/or presenting data.

It should be understood that the computer-readable medium 308 may reside local to and/or remote from the computing device 300 and may be configured to store one or more pieces of data for access by the computing device 300 and/or other components. It should also be understood that the components illustrated in FIG. 3 are merely exemplary and are not intended to limit the scope of this disclosure. More specifically, while the components in FIG. 3 are illustrated as residing within a single computing device 300, this is a non-limiting example. In some aspects, one or more of the components may reside external to the computing device 300, such as within an external computing device that is communicatively coupled to one or more computing devices.

A control system (e.g., an embedded control system) responds to disturbances from the environment or changes to a set-point performed by the plant operation. This may involve ensuring that a particular controlled signal tracks changes in a given (fixed or dynamic) reference value. In order to do so, the controller provides inputs to the plant to regulate its behavior.

Figure 4A:
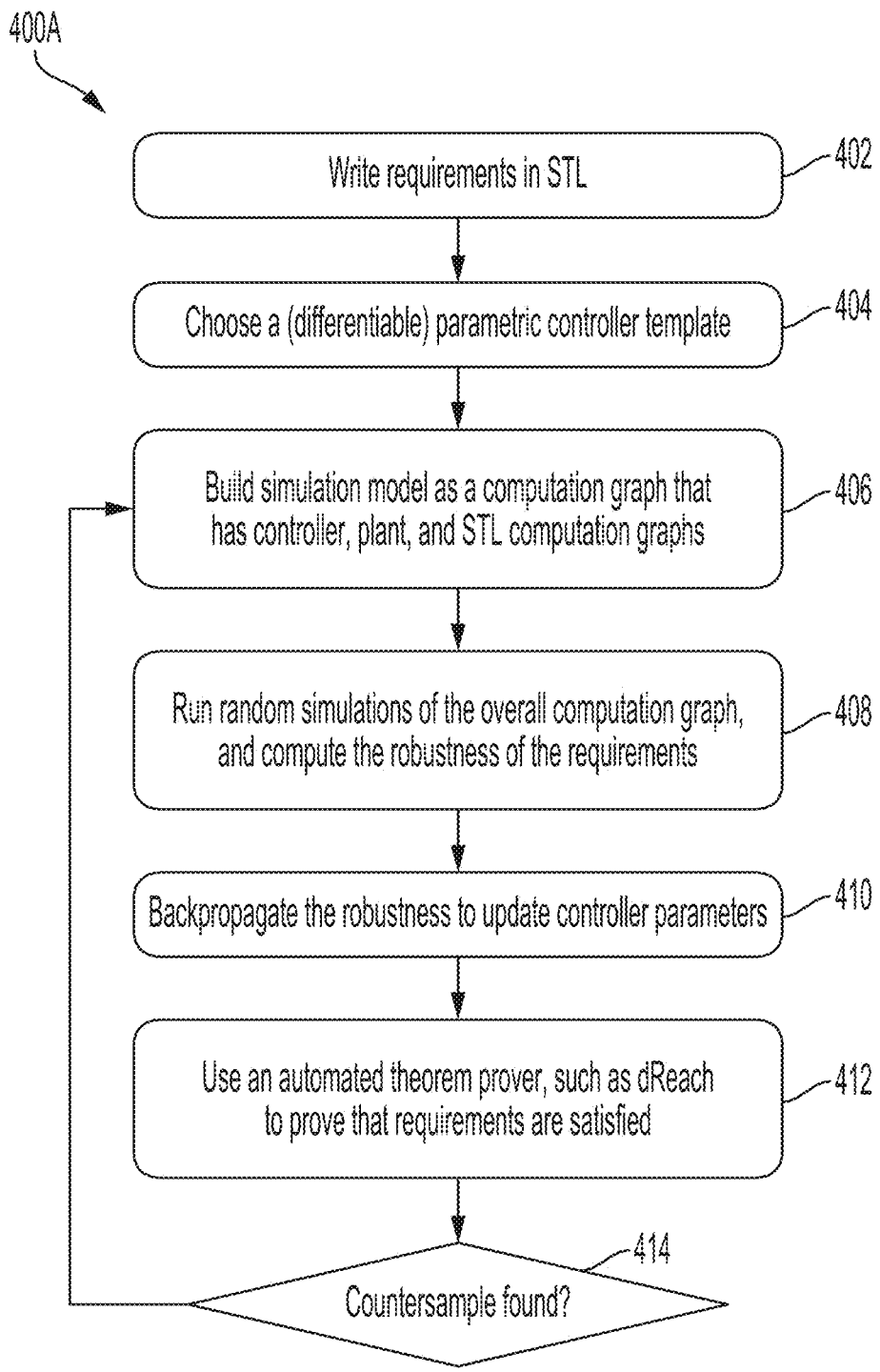
FIG. 4A illustrates a method for synthesizing parameters for control of a closed loop system based on a differentiable simulation model of the closed loop system, according to aspects of the present disclosure.
Figure 4B:
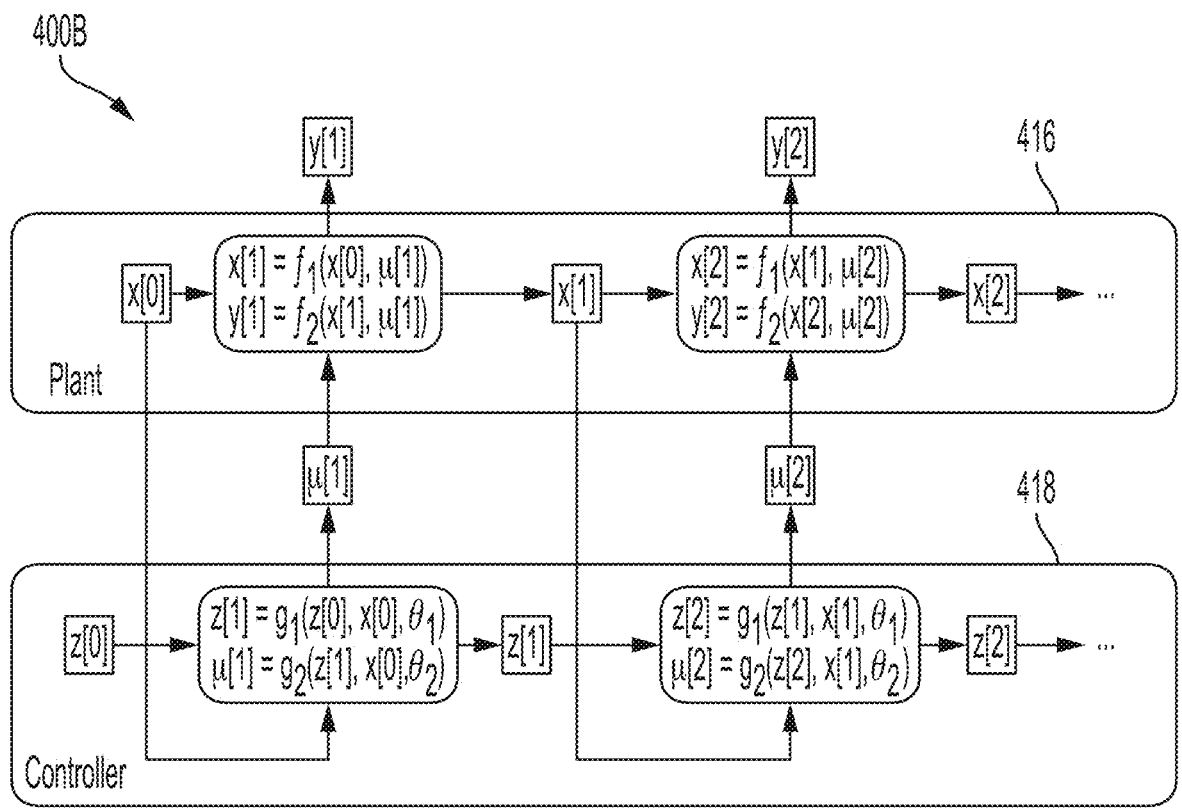
FIG. 4B is an exemplary illustration of a controller and plant of the closed loop system, according to aspects of the present disclosure.

FIG. 4A illustrates a flow diagram of a method 400A for synthesizing parameters for control of a closed loop system based on a differentiable simulation model of the closed loop system, according to aspects of the present disclosure. For example, it may be desirable to control a hardware component using software. The control may be implemented via a closed loop system including the hardware component/plant (e.g., a robot arm or autonomous vehicle) and a controller, as shown in FIG. 4B.

The method starts at block 402 where specifications/ requirements determined for the closed loop system are written in signal temporal logic (STL). The set of requirements may be defined or proposed for the closed loop system. For example, consider a plant 416 of FIG. 4B being a robot arm that is controlled by a controller 418 to catch a ball that drops from a ceiling. A first exemplary specification for this closed loop system is that the robot arm must remain within a certain region of space, which ensures that the robot arm will not bump into other items or people.

Suppose that limits of the robot arm's position are given by [x_min, x_max] and [y_min, y_max], and that a height of movement is unrestricted. Where x_min and x_max are limits along the x-axis and y_min and y_max are limits along the y-axis. Then, this requirement can be expressed in STL as, "Always(x_min≤arm_position_x≤x_max && y_min≤arm_position_y≤y_max)."

A second exemplary requirement for this closed loop system is that the robot arm must catch the ball before it touches the floor, meaning that the ball must never touch the floor. To enforce a criteria that the ball must always be at least one meter above the floor—this requirement in STL may be written as "Always(ball_y≥1)".

A third exemplary specification for this closed loop system is that, after catching the ball, the robot arm must place the ball in a bin within thirty seconds after catching the ball. To achieve this feature, the robot arm may include a special sensor that detects when the ball is caught. For example, a boolean flag (e.g., ball_caught) may be raised to indicate that the ball is caught. Similarly, the bin may include a sensor that raises another boolean flag (e.g., ball_in_bin) when the sensor in the bin detects the ball. This requirement can be specified in signal temporal logic as "(ball_caught->Eventually_[0, 30] ball_in_bin)."

Referring to FIG. 4A, at block 404, a differentiable parametric controller template is selected. The differentiable parametric controller template is based on a parametric control law. Many such parametric templates exist, including proportional-integral-derivative (PID) controllers, state variable feedback, and even neural networks. Some such control laws include an internal state, z. For full generality, the control law selected includes the internal state.

At block 406, a simulation model of the closed loop control system is built as a differentiable computational graph. The computational graph includes a computation graph of the controller 418, the plant 416, and the STL. In one aspect, in order to build the simulation model as a differentiable computational graph, the STL requirements are converted into a smoothly differentiable computation graph, using the techniques, including back propagation for parametric STL, that are described below.

For example it is assumed that the model of the physical component (e.g., the plant 416 and the controller illustrated in FIG. 4B) is available as a differentiable model. This is possible if either the plant model is a continuous-time model, $x'=f(x, u)$ (as shown in FIG. 4B), or if it is given as a discrete update equation that is nonetheless differentiable.

Referring to FIG. 4A, at block 408, the method includes running random simulations of the overall computation graph, and computing a robustness of the requirements. The random simulations and computations are performed as part of a process of learning values of the parameters of the controller. For example, simulation is used to automatically learn values of the parameters of the controller such that the closed loop system will respect the STL templates. To learn the values of the parameters, an initial state for the physical system is selected at random, and the controller state is initialized to some fixed initial state, such as zero. The method also includes running a simulation trace of the closed loop system (controller and plant). At each time step the robustness of the STL requirements is computed.

At block 410, the robustness of the STL requirements are backpropagated to update the controller parameters. For example, the implementations described herein are used to differentiate through the computation graph of the STL formula. Because both the model of the physical system and of the control law are differentiable, a chain rule can be used to obtain a gradient from the robustness signals of the STL requirements all the way through to the parameters of the control law. As a result, a gradient vector dR/dW that includes the derivatives of the robustness signals with respect to the control parameters is obtained. A backpropagation through time implementation is then used to modify the parameters of the control law to improve or maximize the robustness of the STL requirements. For example, numerous random simulations are executed, and the backpropagation through time implementation is used to learn to satisfy the STL requirements.

At block 412, a dynamic constraint solver (e.g., dReach) is used to provide a formal proof that the resulting controller satisfies its specification. At block 414, it is determined whether the proof succeeds. If the proof succeeds, the process is terminated. Otherwise, the process continues to block 406 to continue training the controller. For example, dReach provides an example of a violation, which is used as an example simulation to continue training the controller.

The following are illustrations of syntax and semantics for signal temporal logic. These syntax and semantics are used to provide a lightweight and efficient method to compute STL robustness values and to leverage readily available machine learning frameworks to efficiently fit parametric STL (pSTL) instead of learning complete STL formulas from scratch.

Temporal logic and its many variants (e.g., linear temporal logic (LTL), bounded linear temporal logic (BLTL), linear temporal logic over finite traces (LTLf), metric temporal logic (MTL)) are formalisms for reasoning about timed traces. They are tools for expressing specifications, and enable a wide array of assurance techniques, such as formal verification, falsification, model checking, and systematic testing. These logical languages have been used in many domains including robot motion planning and control, biological systems, and network planning. Specifically, STL, which is an extension to Linear Temporal Logic (LTL), is a specification language for real-valued signals that can be applied to continuous and hybrid systems.

Aspects of the present disclosure may be directed to time-series data. A timed trace is a data structure that includes a time-series. Formally, a timed trace s is an ordered finite sequence of states and their associated time, $s=(x_0, t_0), \ldots, (x_n, t_n)$ where $t_{i-1}<t_i$ and $x_i \in R^n$. Further, aspects of the present disclosure use a notation $s(t_i)=x_i$.

Given a timed trace s that starts at time $t_0$, a timed trace subsequence $(s, t_i)$ is a timed trace starting at time $t_i$, $i \in N_0$.

$$(s,t_i)=(x_i,t_i),(x_{i+1},t_{i+1}), \ldots, (x_n,t_n) \quad 1$$

Further, aspects of the present disclosure use the notation $s_i=(s, t_i)$. Some assumptions may be made to ensure the dimensions of the vectors in some aspects are consistent. For example, if the time steps are not uniformly spaced, the signal can be interpolated as follows:

1): The time steps are uniformly spaced

STL formulas are defined over predicates of the form $f(s)<c$, where s is a timed trace (signal), $f:R^n \rightarrow R$ is a function and $c \in R$. The STL formulas are written using the following grammar:

I:=(a,b)|(a,b]|[a,b)|[a,b]
$\phi := true | f(s)<c | \neg \phi | \phi \wedge \psi | \phi \vee \psi | \Diamond_I \phi | \Box_I \phi | \phi U_I \psi | \phi T_I \psi$   25 where $f(s)<c$ is a predicate, $\Box$ (negation/not), $\wedge$ (conjunction/and), and $\vee$ (disjunction/or) are Boolean connectives, and $\Diamond$ (eventually), $\Box$ (always), U (until) and T (then) are temporal operators. Note, $f(s)>c$ can be achieved by applying a negation on $f(s)<c$. The temporal operators have an associated time interval I where $0 \leq a<b$. For ease of notation, I is dropped from the grammar when $a=0$, $b=\infty$.

2): Without loss of generality, only consider I to be of the form [a, b] or [a, ∞) where $0 \leq a<b$. Following the features discussed with respect to 1) above, if I does not include the endpoints, the boundaries can be changed to the nearest inclusive time step.

Let (s, t) be a timed trace starting at time t. The Boolean semantics of STL can be defined recursively:

$(s,t) \models f(s(t))<C \Leftrightarrow f(s(t))<c$   40
$(s,t) \models \neg \phi \Leftrightarrow \neg ((s,t) \models \phi)$
$(s,t) \models \phi \wedge \psi \Leftrightarrow ((s,t) \models \phi) \wedge ((s,t) \models \psi)$
$(s,t) \models \phi \vee \psi \Leftrightarrow ((s,t) \models \phi) \vee ((s,t) \models \psi)$
$(s,t) \models \Diamond_I \phi \Leftrightarrow \exists t' \in I \oplus t s.t. (s,t') \models \phi$
$(s,t) \models \Box_I \phi \Leftrightarrow \forall t' \in I \oplus t s.t. (s,t') \models \phi$   45
$(s,t) \models \phi U_I \psi \Leftrightarrow \exists t' \in I \oplus t s.t. ((s,t') \models \psi) \wedge ((s,t) \models \Box_{[0,t']} \phi)$
$(s,t) \models \phi T_I \psi \Leftrightarrow \exists t' \in I \oplus t s.t. ((s,t') \models \psi) \wedge ((s,t) \models \Diamond_{[0,t']} \phi)$ For a timed trace (s, t) starting at time t, satisfying $\Box \phi$ means $\phi$ is always true for the entire sequence (because the I is dropped, $I=[0, \infty)$). While satisfying $\Diamond \phi$ means at some time along the sequence, $\phi$ is true at least once. Because STL specifications are defined recursively, temporal operators can be composed with each other. For example, a timed trace (s, t) satisfying $\Diamond \Box_{[1-3]} \phi$ means that eventually $\varphi$ will always be satisfied over the next one to three time units.

Because STL formulas are defined recursively, STL can be represented using a parse tree where each node represents an operation, and the leaves are the predicates. An order of operations is denoted for a formula $\phi$ by $O_\phi$. For example, the STL formulas are defined as follows:

Definition 1 (STL ordering): For an STL formula $\phi$, let PT be the parse tree of $\phi$. Define $O_\phi = \{\varphi 1, \varphi 2, \ldots \varphi k\}$ as a post-order traversal of PT.

A special property of STL is the notion of robustness degree, which is a real value that describes how much a timed trace satisfies (or fails to satisfy) an STL specification. For example, if a signal does not satisfy an STL specification, the robustness degree will indicate the level of violation, and vice versa. This robustness metric expands the utility of temporal logic in many continuous domains, such as in problems pertaining to classification and prediction, optimal control, Hamiltonian-Jacobian reachability and reinforcement learning.

The robustness degree can be calculated recursively according to the quantitative semantics:

$$\rho(s, t, \text{true}) = \rho_{max}$$

$$\rho(s, t, f(s) < c) = c - f(s(t))$$

$$\rho(s, t, \neg \phi) = -\rho(s, t, \phi)$$

$$\rho(s, t, \phi \wedge \psi) = \min(\rho(s, t, \phi), \rho(s, t, \psi))$$

$$\rho(s, t, \phi \vee \psi) = \max(\rho(s, t, \phi), \rho(s, t, \psi))$$

$$\rho(s, t, \Diamond_I \phi) = \max \rho(s, t', \phi) t' \in I \oplus t$$

$$\rho(s, t, \Box_I \phi) = \min \rho(s, t', \phi) t' \in I \oplus t$$

$$\rho(s, t, \phi U_I \psi) = \max(\min(\rho(s, t', \psi), t' \in I \oplus t$$
$$\min \rho(s, t'', \phi)))$$
$$t'' \in [t, t']$$

$$\rho(s, t, \phi T_I \psi) = \max(\min(\rho(s, t', \psi), t' \in I \oplus t$$
$$\max \rho(s, t'', \phi)))$$
$$t'' \in [t, t']$$

Note that there is no difference in using a strict, or non-strict inequality because the robustness value does not change. A robustness trace is defined to describe the robustness value of each timed trace subsequence as follows:

Definition 2 (Robustness Trace): Given a timed trace s starting at time $t_0$ and an STL formula $\phi$, the robustness trace $\tau(s, t_0, \phi)$ is a sequence of robustness values for each subsequence $s_i$ of s. For example:

$$\tau(s, t_0, \phi) = \tau_0, \tau_1, \ldots \tau_n \quad 2$$
$$= \rho(s, t_0, \phi), \rho(s, t_1, \phi), \ldots, \rho(s, t_n, \phi)$$
$$= \rho(s_0, \phi), \rho(s1, \phi), \ldots, \rho(s_n, \phi),$$

where the robustness trace is useful for computing temporal operations.

FIG. 5A is a graphical representation of the signal temporal logic formula $\phi$, illustrated in Example 1. This graphical representation can be generated from a toolbox that implements the proposed method.

Example 1

Let $s=(1, 0), (2, 0.1), (3, 0.2), (4, 0.3), (3, 0.4), (3, 0.5)$ and $q=(1, 0), (2, 0.1), (3, 0.2), (4, 0.3), (5, 0.4), (6, 0.5)$. Consider the specification $\phi = \Diamond \Box_{[0,0.2]}(s>4)$. For the timed trace s, $\phi$ is not satisfied because the signal does not exceed four, while q satisfies $\phi$. The robustness trace for $\phi$'s sub-formula $\Box_{[0,0.2]}(s>4)$ is $$\tau(s,t,\Box_{[0,0.2]}(s>4))=-3,-2,-1,-1,-\rho max,-\rho max \quad 3$$

$$\tau(q,t,\Box_{[0,0.2]}(s>4))=-3,-2,-1,0,-\rho max,-\rho max. \quad 4$$

When $t \oplus I$ is beyond the length of the timed trace, the robustness is equal to $-\rho max$ because $\phi$ is not satisfied.

However, if the signal is not long enough, the value can be set to a previous value. Then the robustness is computed by taking the max over the robustness trace of the sub-formula, $\rho(s, \phi)=-1, \rho(q, \phi)=0$.

A natural extension to STL is parametric STL (pSTL). In pSTL, the specifications are introduced as parametric templates. Generally, the templates are proposed by the user and the goal is to fit parameter values given a timed trace. The mapping from a timed trace to parameter values is a form of feature extraction on varying-length time series data. Feature extraction from time-series data, particularly ones of varying length, is challenging due to the different time scales, and difficulty in defining a similarity metric. Traditional methods such as dynamic time warping and the closely related Skorokhod metric are useful, but are inadequate in learning logical structure which can be crucial for defining similarity. After the feature extraction step, further analysis, such as clustering or regression, can be applied to the extracted feature space.

Let $\phi P$ be a specification template with parameters P (e.g., $\phi_\alpha = \Box f(s) < \alpha$). Given a timed trace s, it is desirable to find a valuation v(P) such that $\phi_v(P)$ is the best description of s. This is equivalent to solving the optimization problem, $$v^*(P) = \underset{P}{\mathrm{argmin}}\; \rho(s, t, \phi P)^2 \qquad 5$$

It is desirable to find parameter values v(P) such that $\rho(s, t, \phi v(P))=0$. However, because calculating the robustness of an STL specification involves recursively applying max and min operations, solving equation 5:

$$v^*(P) = \underset{P}{\mathrm{argmin}}\; \rho(s, t, \phi P)^2$$

becomes a very non-smooth, non-linear and non-convex problem. Standard optimization techniques such as gradient descent and direct methods become ineffective because gradients are non-smooth, and the robustness is expensive to evaluate. There are alternate solutions, but they rely on the formula being monotonic which is not always the case, or recursive techniques which can be very expensive to compute and scale poorly.

A computation graph representation can be used to compute the robustness of an STL formula. For example, the STL requirements are converted into a smoothly differentiable computation graph, using the technique such as, backpropagation for parametric STL. Different codes (e.g., PyTorch) may be used to create the STL computation graphs. For example, a code toolbox may include a graph visualizer to show the graph representation of the STL formula and how it depends on the inputs and parameters.

A computation graph (e.g., directed acyclic graph) is constructed that is a representation G of the robustness and robustness trace calculation for STL formulas. This is summarized in an exemplary implementation (e.g., implementation one). Implementation one may be used for computing robustness and robustness trace using the proposed computation graph method g. The following is an example of implementation one:

Data: Timed trace s, STL formula $\phi$
Result: $\rho^g(s, t, \phi)$, $\tau^g(s, t, \phi)$
1. Reverse s;
2. Construct G by combining $G_{\phi i}$ where $\phi_i \in O_\phi$. The inputs of $G_{\phi i}$ should only depend on outputs from $G_{\phi j}$, j<i;
3. Run the graph;
4. Reverse the output to get $\tau^G(s, t, \phi)$;
5. $\rho^G(s, t, \phi)$ is the first element of $\tau^G(s, t, \phi)$;

For temporal operators, by propagating backward in time via recurrent computation graphs, this method can compute the robustness and robustness trace simultaneously. This is particularly effective for formulas involving nested temporal operators. A computation graph representation is presented for the predicate (f(s)<c), all the Boolean connectives (negation/not, conjunction/and, disjunction/or), and all the temporal operators (And, Eventually, Until and Then). Robustness and soundness of the STL formulas may be defined as follows:

Definition 3 (Valid Robustness Trace): Let C denote a method for computing the robustness of an STL formula $\phi$, and $\tau^C(s, t, \phi)$ is the robustness trace of $\phi$ using the method C. Then $\tau^C(s, t, \phi)$ is a valid robustness trace for $\phi$ if $\tau^C(s, t, \phi) = \tau(s, t, \phi)$.

Definition 4 (Soundness): Let C denote a method for computing the robustness of an STL formula $\phi$. Then C is sound if it produces a valid robustness trace for all timed traces s and for all $\phi$.

The computation graph used to compute the robustness trace of an STL formula $\phi$ is denoted by G. The graph G is made up of smaller computation graphs $G_{\phi k}$ that take a robustness trace of the sub-formula as inputs, and outputs the robustness trace after applying $\phi k$. Because G is a directed acyclic graph where each subgraph is a node, it has a topological ordering. This topological ordering of G given $\phi$ is precisely governed by $O_\phi$, the post-order traversal of the parse tree generated by $\phi$.

FIG. 5B is a representation of $\theta$. In one aspect, let $\theta = \Diamond \Box (\phi \wedge \psi)$, then $O_\theta = \{\phi, \psi, \wedge, \Box, \Diamond\}$. $PT_\theta$ and $G_\theta$ are represented in FIG. 5B and it can be seen that the topological ordering of $G_\theta$ is $\{G_\phi, G_\psi, G_\wedge, G_\Box, G_\Diamond\}$, as shown in FIG. 5C.

FIG. 5C represents a graph of a function G of a formula (e.g., $\theta$) constructed by connecting subgraphs whose node represents each operation. The topological ordering of G is the post-order traversal of the parse tree PT (shown in FIG. 5B) generated by $\theta$.

Figure 6A:
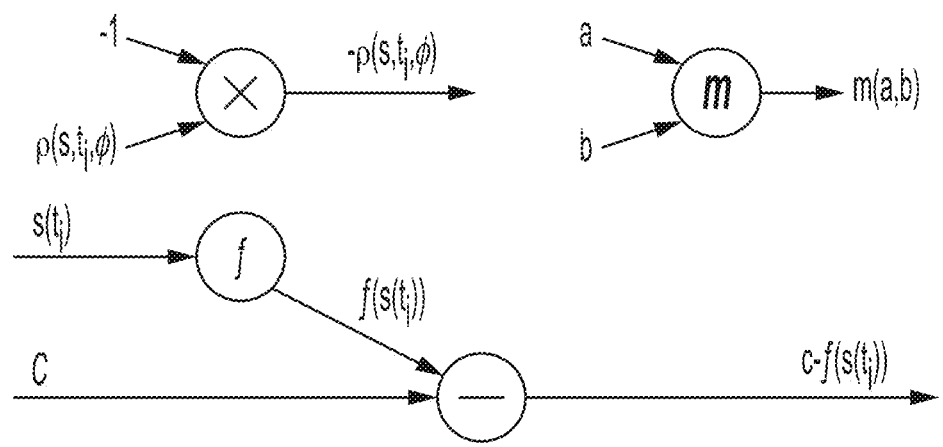
FIGS. 6A-6B are exemplary computation graph representations of robustness functions for predicates, Boolean connective, and an "always" and "eventually" temporal operators, according to aspects of the present disclosure.
Figure 6B:
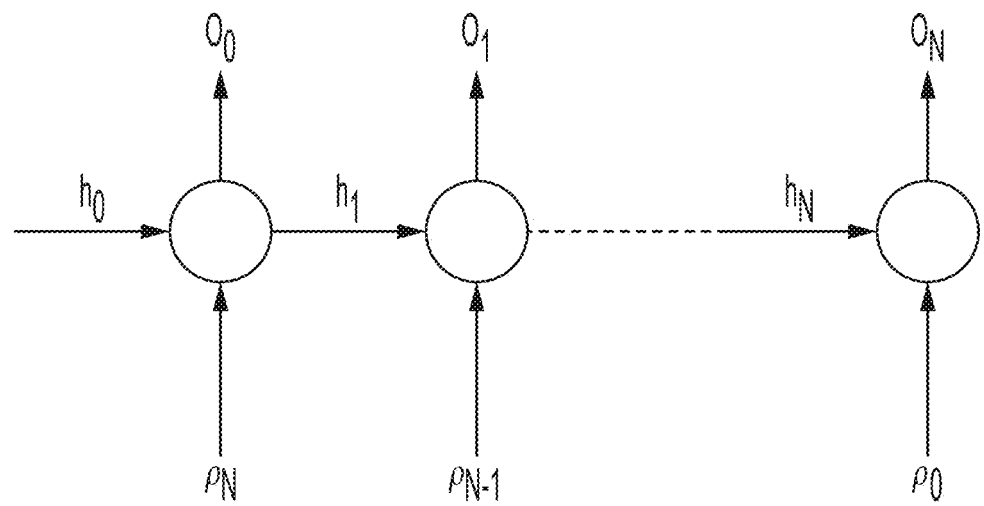

FIGS. 6A-6B are exemplary computation graph representations of the robustness function for the predicates, Boolean connective, and the always and eventually temporal operators, according to aspects of the present disclosure.

The graph representing the robustness at a particular time $t_i$, denoted by $G_\phi^{(i)}$, of predicates and Boolean connectives are illustrated in FIG. 6A. Computing the robustness of these operators rely only on elementary operations, so constructing $G_\phi^{(i)}$ is straight-forward. To compute the robustness trace (e.g., construct the graph $G_\phi$), $G_\phi^{(i)}$ is repeated over the timed trace. Inspired by recurrent neural networks and their ability to effectively process sequential data, a recurrent computation graph model is used to compute the robustness, and robustness trace of the $\Diamond$ (eventually) and $\Box$ (always) operators. This structure can be leveraged and extended to compute the U (Until) and T (Then) operator.

Suppose $\psi = O_{I\phi}$ where O represents either $\Diamond$ (eventually) or $\Box$ (always). The graphical model for $G_O$ is depicted by FIG. 6B. $G_O$ takes a robustness trace of length N+1 as an input, and outputs a robustness trace after applying the O operator.

In one aspect, $\rho_i$ represents $\rho(s, t_i, \phi)$, $h_i$ is a hidden state, and $o_i$ is an output at each cell i. Because I describes future times (e.g., $0 \le a < b$) from the given current time t, it is desirable to propagate backwards in time in order for the computation graph to have knowledge about the values at $t \oplus I$. In one aspect, a backward sequence may be defined with $\tilde{\rho}$. For example, $\tilde{\rho}_N = \rho_0, \ldots, \tilde{\rho}_i = \rho_{N-i}, \ldots \tilde{\rho}_0 = \rho_N$.

If $O = \Diamond$, then $h_0 = -\rho_{max}$ and m=max, otherwise if $O = \Box$, $h_0 = \rho_{max}$ and m=min. The computation graph for the m operator is given in FIG. 6A, but adjusted to accept more inputs. For each computation node (cell), the following update equations are applied:

Case 1: $I = [0, \infty)$
  $o_i = m(\tilde{\rho}_i, h_i)$, $h_{i+1} = o_i$
Case 2: $I = [a, \infty)$, $a > 0$. The start of s can be truncated such to obtain Case 1.
Case 3: $I = [0, b]$, $b < \infty$. Let m be the number of samples from s that lie in $[0, b]$.
Then $h_i \in \mathbb{R}^m$, $h_i = [h_{i1}, h_{i2}, \ldots, h_{im}]$, $h_0$ is a vector of $\pm\rho$max instead of a scalar, and
  $o_i = m(\tilde{\rho}_i, h_{i1}, h_{i2}, \ldots, h_{im})$, $h_{i+1} = [h_{i2}, \ldots, h_{im}, \tilde{p}_i]$
Case 4: $I = [a, b]$, $b < \infty$. Let m be the number of samples from s that lie in $[0, b]$, and k be the number of samples from s that lie in I. Then $h_i \in \mathbb{R}^m$, $h_i = [h_{i1}, h_{i2}, \ldots, h_{im}]$, $h_0$ is a vector of $\pm\rho$max instead of a scalar, and
  $o_i = m(h_{i1}, \ldots, h_{ik})$, $h_{i+1} = [h_{i2}, \ldots, h_{im}, \tilde{\rho}_i]$
Equivalently, the start of s can be truncated to obtain Case 3.

For both Cases 3 and 4, $h_i$ is a vector of all the robustness values at each time step $t' \in t \oplus I$ excluding the value at the current time for that cell i. Then the $h_{i+1}$ update is simply shifting the vector in time by one step, removing the oldest value, and updating the newest values with the current value $\tilde{\rho}_i$.

For the Until and Then operators, the second argument of the inner min operation is actually $\Box_{[t,t']}\phi$ and $\Diamond_{[t,t']}\phi$, respectively. Thus, the robustness trace can be computed for each term in the robustness formula and the appropriate max and min functions can be taken to obtain the robustness trace for the Until and Then operations.

The outputs of the temporal graph are the elements of the robustness trace but in reverse. This reversal is accounted for in implementation one. Although implementation one outputs $\rho(s, t, \phi)$ and $\tau(s, t, \phi)$, because a computation graph is used, the robustness and robustness trace of any sub-formula of $\phi$ is easily obtained as the graph is propagated.

Regarding soundness of G, given the details of G described above, the following theorems are made:

Theorem 1 (Soundness): The sequence $\tau^G(s, t, \phi)$ is equivalent to the robustness trace $\tau(s, t, \phi)$ for all s, t and $\phi$.

This theorem can be proven by structural induction on $\phi$ by showing that $\tau^G(s, t, f(s(t)) < c)$ is the same as $\tau(s, t, f(s(t)) < c)$. By construction (see FIG. 6A), $\rho^G(s, t, f(s(t)) < c) = c - f(s(t)) = \rho(s, t, f(s(t)) < c)$. Thus $\tau^G(s, t, f(s(t)) < c) = \tau(s, t, f(s(t)) < c)$.

Assuming that $\tau^G(s, t, \phi)$ and $\tau^G(s, t, \psi)$ are valid robustness traces for $\phi$ and $\psi$ respectively, it follows that $\rho^G(s, t_i, \phi) = \rho(s, t_i, \phi)$ and $\rho^G(s, t_i, \psi) = \rho(s, t_i, \psi)$. It is then desirable to show that $\tau^G(s, t, \phi \wedge \psi)$, $\tau^G(s, t, \phi \vee \psi)$, $\tau^G(s, t, \neg \phi)$, $\tau^G(s, t, \Diamond \phi)$, $\tau^G(s, t, \Box \phi)$, $\tau^G(s, t, \phi U \psi)$, and $\tau^G(s, t, \phi T \psi)$ are all valid robustness traces, which shows that the cases for $\wedge$, $\vee$ and $\neg$ follow naturally from the construction of their computation graphs. For illustrative purposes, only the proof for $\wedge$ is given:

$$\rho^G(s, t_i, \phi \wedge \psi) = \min(\rho^G(s, t_i, \phi), \rho^G(s, t_i, \psi)) \quad 6$$
$$= \min(\rho(s, ti, \phi), \rho(s, ti, \psi))$$
$$= \rho(s, ti, \phi \wedge \psi)$$

For $O = \Diamond$ or $\Box$, by construction, $\rho^G(s, t_i, O\phi) = o_{N-i}$ because the timed trace is fed backwards in time through the network, where $o_i$ depends on information in the future only. For example, $o_i$ is computed using a subsequence at $t_{N-i}$. Again, by construction on $o_i$ and $h_i$, for all the different cases for I described herein, $$o_{N-i} = m \; \rho(s, t_k, \phi) \quad 7$$
$$k \in t_i \oplus I$$
$$= \rho(s, t_i, O_I \phi)$$
$$\therefore \rho^G(s, t_i, O_I \phi) = \rho(s, t_i, O_I \phi). \quad 8$$

To prove for U (and it follows easily to T), first define (s, $t_{-i}$) as a sequence from $t_0$ to $T_i$. By construction and because it has been proven that the other operators all have valid robustness traces:

$$\rho^G(s, t, \phi U_I \psi) = \max_{i \in t \oplus I}(\min(\rho^G(s, t_i, \psi), \min_{i' \in [0,i]} \rho^G(s, t_{i'}, \phi))) \quad 9$$
$$= \max_{i \in t \oplus I}(\min(\rho^G(s, t_i, \psi), \rho^G(s, t_{-i}, \Box \phi)))$$
$$= \max_{i \in t \oplus I}(\rho^G(s, t, (\rho^G(s, t_i, \psi) \wedge \rho^G(s, t_{-i}, \Box \phi))))$$
$$= \max_{i \in t \oplus I}(\min(\rho(s, t_i, \psi), \min_{i' \in [0,i]} \rho(s, t_{i'}, \phi)))$$
$$= \rho(s, t, \phi U_I \psi)$$

Note that by using $\tau^G(s, t_{-i}, \Box \phi)$ instead of $\rho^G(s, t_{-i}, \Box \phi)$ the robustness trace (up to time $t_i$) for $\rho^G(s, t, \phi U_i \psi)$ is obtained.

Because soundness has been shown for all the STL operators, it follows that the STL operators also have completeness. It has been shown that G can be used to compute a valid robustness trace for any formula. In particular, the computation complexity of G is shown to scale linearly with the length of the signal, or quadratically for the Until and Then operations, and also linearly with the application of more temporal operations (e.g., tree depth of PT).

Although a computation graph can be used to compute the robustness of an STL formula exactly, taking gradients with respect to pSTL parameters may present some challenges due to the non-smooth nature of the max and min functions. Aspects of the present disclosure are directed to using a general computation graph library to take the gradient with respect to a parameter using backpropagation by making a smooth approximation.

Implementation two shows how G can be used to solve for pSTL parameters. For example, Implementation two can be used to solve equation 5

$$v^*(P) = \operatorname*{argmin}_{P} \rho(s, t, \phi P)^2$$

using G and the differentiable approximations. A built-in auto-differentiation functionality in many machine learning (ML) toolboxes can be used to backpropagate on the computation graph. The following is an example of implementation two:

---

Data: Timed trace s, pSTL formula ($\phi_P$, maximum number of iterations N, robustness tolerance $\rho$tol, gradient tolerance $g_{tol}$, annealing function A, learning rate $\gamma$.
Result: v(P)
Initialize v(P);
Construct G;
for i ← 0 to N do
    Compute $\rho_e = \rho(s, t, (\phi_{v(P)})^2$;
    if $\rho_e < \rho$tol, then
        break ;
    else
        $w_i$ ← A(i). Get the scaling parameter from the annealing function;
        Compute the loss $l = \rho(s, t, \phi_{v(P)}, w_i)^2$;

Use backpropagation on $l$ to get $\frac{\partial \ell}{\partial P}$;

if $\left\| \frac{\partial \ell}{\partial P} \right\|^2 < g_{tol}$ then
        break;
    end
    Update v(P) using a step size of $\gamma$;
end
end

---

Implementation two shows how G can be used to solve for pSTL parameters. This is a gradient descent algorithm where the termination criteria depends on the true value of $\rho$ and the gradient, and the relaxation parameter w is annealed over each iteration so that towards the end of the optimization process, the approximation of the max and min functions are more exact. As the parameter w increases or becomes larger, the softmax function more closely approximates the max function.

Depending on the application and assumptions, absolute exactness of the parameters is not strictly necessary. For example, when pSTL is used for feature extraction, rather than for formal verification and/or model checking, post-analysis methods such as clustering or regression have inherent noise assumptions which can be accounted for by the inexactness. Thus, differentiable approximations of the min and max operators are proposed in order to make the solution to equation 5

$$v^*(P) = \underset{P}{\mathrm{argmin}}\, \rho(s, t, \phi P)^2$$

more tractable especially when the formula has multiple temporal operators. This differentiable approximation when coupled with the computation graph representation G offers the following benefits:
1) The g representation admits the use of backpropagation to compute gradients even for highly complex pSTL formulas;
2) A smooth differentiable approximation can improve convergence for more complicated pSTL formulas; and
3) The benefits of PyTorch or Tensorflow (i.e., state-of-the-art modern machine learning software tools) can be leveraged. For example, the optimization toolkits for these tools can be used to easily implement on parallel hardware, and evaluate multiple signals via batching.

Because the proposed approach operates on computation graphs, it can potentially be used in conjunction with existing deep learning frameworks which are generally acting as a black box. For example, the proposed approach and existing deep learning frameworks can be used for intent prediction over long time horizons. This follows because the proposed approach and existing deep learning frameworks operate on computation graphs and rely on backpropagation for optimization.

The proposed approach optimizes spatial parameters. In addition, the proposed approach is applicable to temporal parameters, which do not apply to parameters that define the interval I. Optimizing over temporal operators is nontrivial because it is discrete and has a finite domain. The temporal parameter approach may be based on long short-term memory (LSTM) networks that use the idea of "forget" gates that extract information from relevant times.

Regarding the min/max approximations, let $x \in \mathbb{R}^n$ and $w \in \mathbb{R} \geq 0$, then the max and min approximations are:

$$\widetilde{max}(x;w) = \frac{\sum_i^n x_i \exp(w x_i)}{\sum_j^n \exp(w x_j)} \qquad 10$$

$$\widetilde{min}(x;w) = \frac{\sum_i^n x_i \exp(-w x_i)}{\sum_j^n \exp(-w x_j)} \qquad 11$$

Where, w is a scaling parameter, and when $w \to \infty$, this approximation approaches the true maximum or minimum, while w=0 gives the average of the values in x. There are alternate approaches because this approximation becomes challenged when $w \to \infty$. However, w may be restricted from getting too large (this parameter can be annealed) to ensure that x is scaled appropriately.

In some aspects, every max and min operation in the robustness formula may be replaced by $\widetilde{max}$ and $\widetilde{min}$. The equations for $\widetilde{max}$ and $\widetilde{min}$ use elementary operations that can be directly converted into a computation graph. For example, the feature $\rho(s, t, (b; w)$ is written to indicate that the robustness is computed using the approximation parametrized by w.

Although the description herein is largely directed to a robot arm, the aspects of the present disclosure are equally applicable to other complex robotic systems such as autonomous vehicles. In particular, the aspects of the present disclosure may be applicable to scenario based testing for autonomous driving. For example, the proposed approach may be used to manage the behavior of the autonomous vehicle.

The "rules of the road," for the most part, govern how people behave while driving. Thus, high-level behaviors can often be described using rule-based or logic-based techniques. However, this depends on domain knowledge, and not all the rules are always met as there is a spectrum in how individuals obey these rules. For example, some drivers tend to tail gate, while others maintain a three-second gap. Aspects of the present disclosure are directed to a testing strategy for autonomous vehicles that make use of this rule-based domain knowledge. For this purpose, a modeling language that offers rigidity with regards to the rule-based nature of driving is specified.

For example, it may be desirable to manage important quantities such as, "the car would turn left only if there was a sufficiently large gap." The autonomous vehicle may weave in traffic, which creates a challenging task where two cars must swap lanes in a short amount of time (e.g., in a highway on/off-ramp). pSTL formulas can be used to identify factors that contribute to making traffic-weaving challenging, and are useful in designing challenging driving scenarios.

Some potential quantities that may be important for the traffic-weaving task may be identified. For example, an important quantity is "time to collision" (ttc), especially while executing a lane change (along with many others). This quantity is defined in the following equation:

$$ttc(x_1, x_2, v_1, v_2) = -\frac{x1-x2}{v1-v2} \quad \quad 12$$

Here, $x_i$ and $v_i$ represent a longitudinal distance and a velocity of the car i, assuming both cars are traveling almost parallel. To quantify how ttc actually affects the difficulty of the scenario, a pSTL formula is proposed that describes a lane-change, $$\varphi = \Diamond \Box_{[0,\tau]}(\Delta y < 3 \wedge ttc > \gamma), \quad \quad 13$$

where $\Delta y$ is the lateral distance between an ego vehicle and the other vehicle.

This formula can be translated as "eventually," when the ego car is starting to move over to the adjacent lane over an interval of $\tau$ seconds, the ttc with the adjacent car should be larger than $\gamma$. In one aspect, $\Delta y < 3$ may be selected because the width of an average car is slightly less than three meters. The parameters to be learned are $\tau$ and $\gamma$. Because $\tau$ represents the length of a lane-change maneuver (when $\Delta y<3$), $\tau$ can be computed from data. Thus, the remaining parameter $\gamma$ can be defined using the method outlined herein. For example, given a dataset D of n trials, for each trial $s^{(i)} \in D$, the pSTL problem can be solved using the method outlined herein to obtain $$\{\tau^{(i)}\}_{i=1}^n \text{ and } \{\gamma^{(i)}\}_{i=1}^n \quad \quad 14$$

In some aspects, the formula can be applied to front adjacent and rear adjacent cars of an ego vehicle. The adjacent side may be defined as the side that the ego vehicle is attempting to change into. The two cars are in a collision if their distance from each other is within some tolerance. Thus, there is a distinct range for $\gamma$ that relates to front-end collisions, and similarly, there is also a range that relates to rear-end collisions. These ranges correspond to small $\tau$. This means when cars are changing lanes rapidly and have ttc within some threshold, they are more prone to collisions. However, there does not seem to be any relationship when $\tau$ is larger, corresponding to a longer lane change. Parameter boundaries can be leveraged to design other cars on the road to be more adversarial and hence "stress-test" the ego-car's driving policy and accelerate the evaluation of an autonomous car. For example, one can design a car that purposely drives to keep ttc below some threshold.

Figure 7:
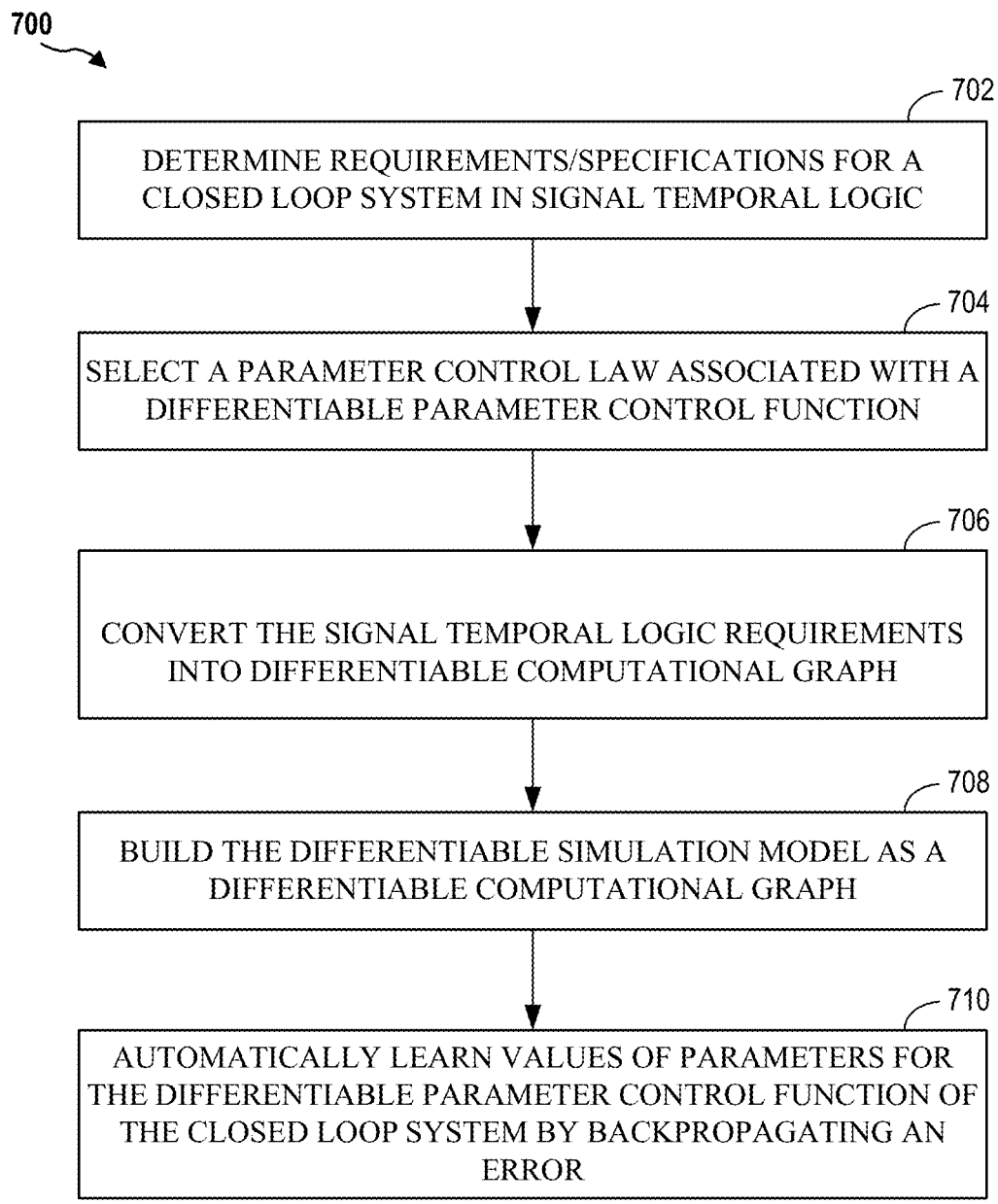
FIG. 7 illustrates another method for synthesizing parameters for control of a closed loop system based on a differentiable simulation model of the closed loop system, according to aspects of the present disclosure.

FIG. 7 illustrates a method 700 for synthesizing parameters for control of a closed loop system based on a differentiable simulation model of the closed loop system. As shown in FIG. 7, at block 702, requirements/specifications for the closed loop system in signal temporal logic (STL) is determined. At block 704, a parametric control law having a differentiable parameter control function. At block 706, the signal temporal logic specifications are converted into differentiable computational graphs. At block 708, the differentiable simulation model is built as a differentiable computational graph. At block 710, values of parameters for the differentiable parameter control function of the closed loop system are automatically learned by backpropagating an error.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling an autonomous device associated with a closed loop system, the method comprising:
    determining rules for the autonomous device in signal temporal logic (STL);
    selecting a parametric control law having a differentiable parameter control function for a controller of the autonomous device;
    converting the rules to a first differentiable computational graph;
    generating a second differentiable computational graph from a differentiable simulation model of the autonomous device;
    learning parameter values for the differentiable parameter control function based on simulations of an overall computational graph comprising the first differentiable computational graph and the second differentiable computational graph; and
    controlling the autonomous device based on the learned parameter values of the differentiable parameter control function.

2. The method of claim 1, further comprising converting the rules using backpropagation for signal temporal logic.

3. The method of claim 1, in which the differentiable parameter control function comprises a proportional integral derivative (PID) controller, a state variable feedback controller, set points, look up tables, or a neural network.

4. The method of claim 1, in which the differentiable simulation model comprises a continuous-time model or a differentiable discrete model.

5. The method of claim 1, further comprising:
    selecting an initial state for the closed loop system;
    initializing the differentiable parameter control function to a fixed initial state;
    determining a robustness value for the rules in signal temporal logic at each time step when a simulation trace is run;
    differentiating through the first differentiable computational graph; and
    generating the differentiable simulation model based on differentiating through the first differentiable computational graph.

6. The method of claim 1, further comprising modifying parameters of the parametric control law using backpropagation.

7. The method of claim 1, further comprising performing random simulations of the overall computational graph using backpropagation.

8. An apparatus for controlling an autonomous device associated with a closed loop system, the apparatus comprising:
    a memory; and
    at least one processor coupled to the memory, the at least one processor configured:
        to determine rules for the autonomous device in signal temporal logic (STL);
        to select a parametric control law having a differentiable parameter control function for a controller of the autonomous device;
        to convert the rules to a first differentiable computational graph;
        to generate a second differentiable computational graph from a differentiable simulation model of the autonomous device;
        to learn parameter values for the differentiable parameter control function based on simulations of an overall computational graph comprising the first differentiable computational graph and the second differentiable computational graph; and
        to control the autonomous device based on the learned parameter values of the differentiable parameter control function.

9. The apparatus of claim 8, in which the at least one processor is further configured to convert the rules using backpropagation for signal temporal logic.

10. The apparatus of claim 8, in which the differentiable parameter control function comprises a proportional integral derivative (PID) controller, a state variable feedback controller, set points, look up tables, or a neural network.

11. The apparatus of claim 8, in which the differentiable simulation model comprises a continuous-time model or a differentiable discrete model.

12. The apparatus of claim 8, in which the at least one processor is further configured:
    to select an initial state for the closed loop system;
    to initialize the differentiable parameter control function to a fixed initial state;
    to determine a robustness value for the rules in signal temporal logic at each time step when a simulation trace is run;
    to differentiate through the first differentiable computational graph; and
    to generate the differentiable simulation model based on differentiating through the first differentiable computational graph.

13. The apparatus of claim 8, in which the at least one processor is further configured to modify parameters of the parametric control law using backpropagation.

14. The apparatus of claim 8, in which the at least one processor is further configured to run random simulations of the overall computational graph using backpropagation.

15. A non-transitory computer-readable medium having program code recorded thereon for controlling an autonomous device associated with a closed loop system, the program code executed by a processor and comprising:

program code to determine rules for the autonomous device in signal temporal logic;

program code to select a parametric control law having a differentiable parameter control function for a controller of the autonomous device;

program code to convert the rules to a first differentiable computational graph;

program code to generate a second differentiable computational graph from a differentiable simulation model of the autonomous device;

program code to learn parameter values for the differentiable parameter control function based on simulations of an overall computational graph comprising the first differentiable computational graph and the second differentiable computational graph; and program code to control the autonomous device based on the learned parameter values of the differentiable parameter control function.

16. The non-transitory computer-readable medium of claim 15, in which the program code further comprises program code to convert the rules using backpropagation for signal temporal logic.

17. The non-transitory computer-readable medium of claim 15, in which the differentiable parameter control function comprises a proportional integral derivative (PID) controller, a state variable feedback controller, set points, look up tables, or a neural network.

18. The non-transitory computer-readable medium of claim 15, in which the differentiable simulation model comprises a continuous-time model or a differentiable discrete model.

19. The non-transitory computer-readable medium of claim 15, in which the program code further comprises:

program code to select an initial state for the closed loop system;

program code to initialize the differentiable parameter control function to a fixed initial state;

program code to determine a robustness value for the rules in signal temporal logic at each time step when a simulation trace is run;

program code to differentiate through the first differentiable computational graph; and program code to generate the differentiable simulation model based on differentiating through the first differentiable computational graph.

20. The non-transitory computer-readable medium of claim 15, in which the program code further comprises program code to modify parameters of the parametric control law using backpropagation through time.

21. The non-transitory computer-readable medium of claim 15, in which the program code further comprises program code to run random simulations of the overall computational graph using backpropagation.

\* \* \* \* \*